United States Patent [19]
Leung et al.

[11] Patent Number: 6,154,743
[45] Date of Patent: Nov. 28, 2000

[54] TECHNIQUE FOR ACCESSING HETEROGENEOUS DIRECTORY SERVICES IN AN APPN ENVIRONMENT

[75] Inventors: Patrick Pak-Chiu Leung; Meng-Hsiung Lyu, both of Cupertino; Anson Chen, Atherton, all of Calif.

[73] Assignee: Cisco Technology, Inc., San Jose, Calif.

[21] Appl. No.: 09/097,957

[22] Filed: Jun. 16, 1998

[51] Int. Cl.$^7$ ................................................. G06F 17/30
[52] U.S. Cl. ........................... 707/10; 709/220; 709/226; 709/249
[58] Field of Search ............... 707/10, 103; 709/202, 709/205, 213, 224, 223–226, 240–244

[56] References Cited

U.S. PATENT DOCUMENTS

| | | | |
|---|---|---|---|
| 4,922,486 | 5/1990 | Lidinsky et al. | 370/60 |
| 5,210,750 | 5/1993 | Nassehi et al. | 370/85.2 |
| 5,261,060 | 11/1993 | Free | 395/200 |
| 5,274,631 | 12/1993 | Bhardwaj | 370/60 |
| 5,416,769 | 5/1995 | Karol | 370/60 |
| 5,440,744 | 8/1995 | Jacobson et al. | 395/650 |
| 5,446,888 | 8/1995 | Pyne | 395/600 |
| 5,473,608 | 12/1995 | Gagne et al. | 370/85.13 |
| 5,546,549 | 8/1996 | Barrett et al. | 395/309 |
| 5,561,669 | 10/1996 | Lenney et al. | 370/60.1 |
| 5,634,006 | 5/1997 | Baugher et al. | 395/200.06 |
| 5,715,395 | 2/1998 | Brabson et al. | 709/213 |
| 5,719,942 | 2/1998 | Aldred et al. | 380/49 |
| 5,787,237 | 7/1998 | Reilly | 395/112 |
| 5,983,234 | 11/1999 | Tietjen et al. | 707/103 |

OTHER PUBLICATIONS

Jesper Nilausen, APPN Networks, "Appn Basics" Copyright 1994 by John Wiley & Sons, Ltd., pp. 11–99.
J. Ranade IBM Series, Introduction to SNA Networking Using VTAM/NCP, Copyright 1989 by Jay Ranade and George C. Sackett, pp. 104–111.
Andrew S. Tanenbaum, Second Edition, Computer Networks, Copyright 1988 by Prentice–Hall, Inc., pp. 262–267.
Designing APPN Internetworks, http://www.cisco.com/univercd/cc/td/doc/cisintwk/idg4/nd2006.htm, Copyright 1989 to 1998, pp. 1 to 39.
IBM Systems Network Architecture Formats, GA27–3136–16, Copyright IBM Corp. 1977, 1996, pp. 1–1 to B24,
Systems Network Architecture IBM APPN Architecture Reference, SC30–3422–04, Copyright International Business Machines Corporation, 1986–1996, pp. 1–1 to X43.
Network Working Group, Request for Comments, Data Link Switching: Switch–to–Switch Protocol AIW DLSw RIG:DLSw Closed Pages, DLSw Standard Version 1.0, L. Wells and A. Bartky, Synch Research, Inc. Apr. 1995, pp. 1 to 91.
Yeong, W., Howes. T., & Kille, S., "Lightweight Directory Access Protocol," Network Working Group, Request for Comments: 1777; Mar. 1995, pp. 1–22.
Howes, T. & Smith, M., "The LDAP Application Program Interface, " Network Working Group, Request for Comments: 1823, Aug. 1995, pp. 1–22.

Primary Examiner—Hosain T. Alam
Attorney, Agent, or Firm—Cesari and McKenna, LLP

[57] ABSTRACT

A technique offloads a central directory services (CDS) function from a mainframe of an advanced peer-to-peer networking (APPN) network to a light-weight directory access protocol (LDAP) Accessible Directory Services (LADS) residing off the mainframe on another dissimilar network. At least one network node of the APPN network is configured with LDAP interface that enables communication with the LADS. The LADS is configured to provide CDS functionality on the dissimilar network, such as a Transmission Control Protocol/Internet Protocol network. In response to a request from a node on the APPN network, the LDAP interface accesses the LADS using the LDAP protocol in accordance with a client-server architecture.

21 Claims, 5 Drawing Sheets

TECHNIQUE FOR ACCESSING HETEROGENEOUS DIRECTORY SERVICES IN AN APPN ENVIRONMENT

FIELD OF THE INVENTION

This invention relates generally to directory services in a computer network and, more specifically, to a technique that offloads centralized directory services functions from one network to another so as to improve the efficiency of network bandwidth usage in the one network.

BACKGROUND OF THE INVENTION

Data communication in a computer network involves the exchange of data between two or more entities interconnected by communication links and subnetworks. These entities are typically software programs executing on hardware computer platforms, such as end stations and intermediate stations. Examples of an intermediate station may be a router or switch which interconnects the communication links and subnetworks to enable transmission of data between the end stations. A subnetwork may include a local area network (LAN) that provides relatively short distance communication among the interconnected stations; in contrast, a wide area network (WAN) enables long distance communication over links provided by public or private telecommunications facilities.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modem communications network architectures are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. Examples of such communications architectures include the Systems Network Architecture (SNA) developed by International Business Machines Corporation and the Internet communications architecture.

Figure 1:
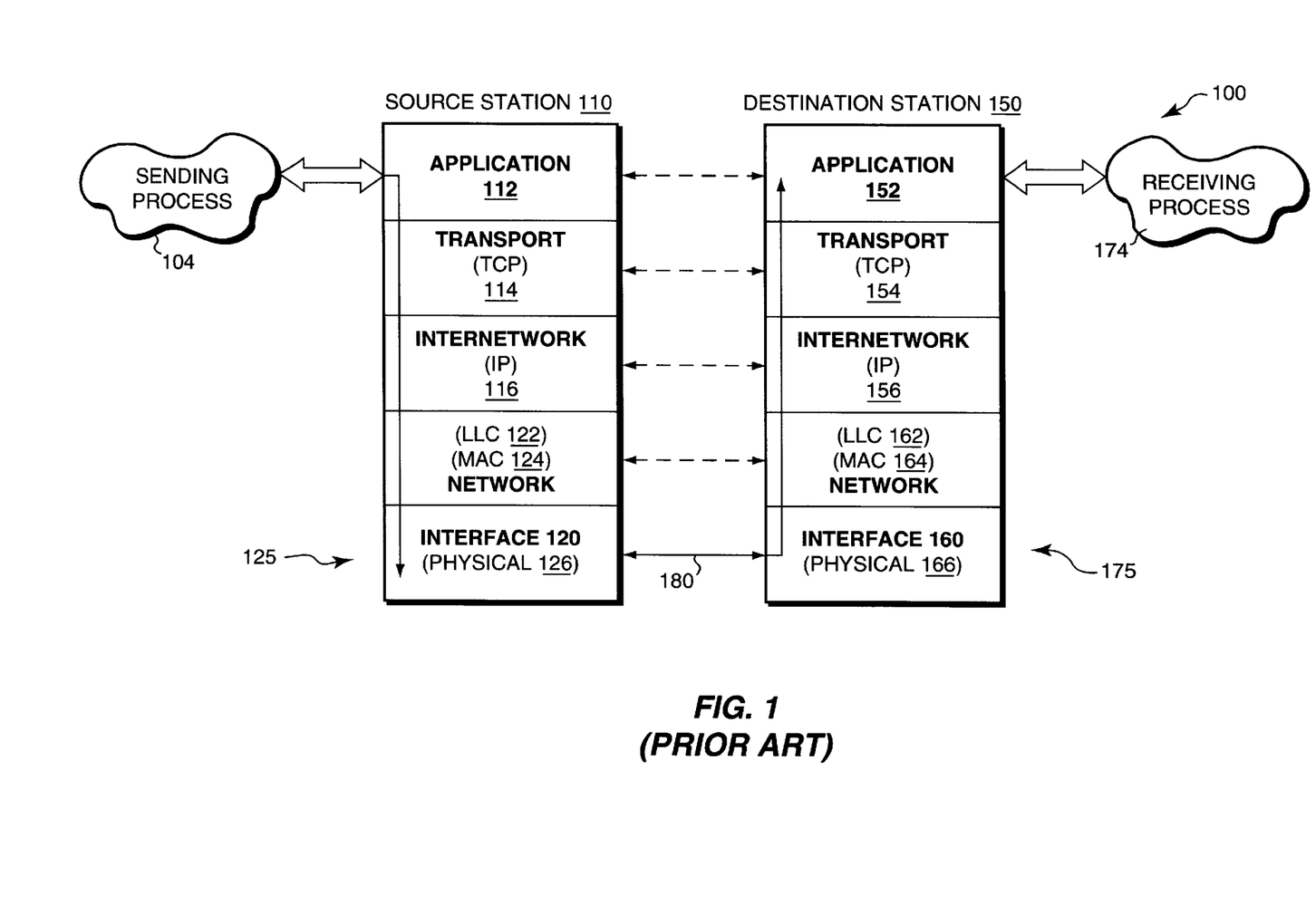
FIG. 1 is a schematic block diagram of prior art communications architecture protocol stacks, such as the Internet protocol stack, used to transmit data between stations of a computer network.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 of the Internet architecture accepts industry standards defining a flexible network architecture oriented to the implementation of LANs.

Specifically, the network interface layer 120 comprises physical and data link sublayers. The physical layer 126 is concerned with the actual transmission of signals across the communication channel and defines the types of cabling, plugs and connectors used in connection with the channel. The data link layer, on the other hand, is responsible for transmission of data from one station to another and may be further divided into two sublayers: Logical Link Control (LLC 122) and Media Access Control (MAC 124). The MAC sublayer 124 is primarily concerned with controlling access to the transmission medium in an orderly manner and, to that end, defines procedures by which the stations must abide in order to share the medium. The LLC sublayer 122 manages communications between devices over a single link of the network and provides for environments that need connectionless or connection-oriented services at the data link layer.

Connection-oriented services at the data link layer generally involve three distinct phases: connection establishment, data transfer and connection termination. During connection establishment, a single path or connection, e.g., an IEEE 802.2 LLC Type 2 or "Data Link Control" (DLC) connection as referred hereinafter, is established between the source and destination stations. Once the connection has been established, data is transferred sequentially over the path and, when the DLC connection is no longer needed, the path is terminated. The details of such connection establishment and termination are well-known.

The transport layer 114 and the internetwork layer 116 are substantially involved in providing predefined sets of services to aid in connecting the source station to the destination station when establishing application-to-application communication sessions. The primary network layer protocol of the Internet architecture is the Internet protocol (IP) contained within the internetwork layer 116. IP is primarily a connectionless network protocol that provides internetwork routing, fragmentation and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. The term TCP/IP is commonly used to refer to the Internet architecture. Protocol stacks and the TCP/IP reference model are well-known and are, for example, described in *Computer Networks* by Andrew S. Tanenbaum, printed by Prentice Hall PTR, Upper Saddle River, N.J., 1996.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process.

SNA is a mainframe-oriented network architecture that also uses a layered approach. The services included within this architecture are generally similar to those defined in the Internet communications architecture. In a SNA network, though, applications executing on end stations typically access the network through logical units (LU) of the stations; accordingly, in a typical SNA network, a communication session connects two LUs in an LU-LU session. Activation and deactivation of such a session is addressed by Advanced Peer to Peer Networking (APPN) functions. These APPN functions generally include session establishment and session routing within an APPN network.

Figure 2:
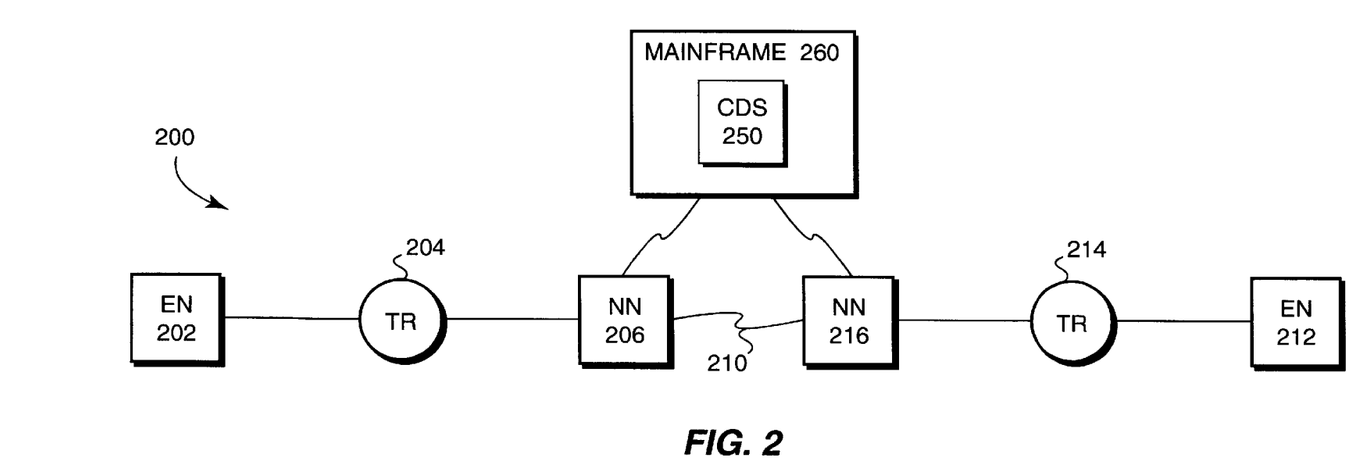
FIG. 2 is a schematic block diagram of a prior art Advanced Peer to Peer Networking (APPN) network including APPN nodes.

FIG. 2 is a schematic block diagram of a prior art APPN network 200 comprising two end stations 202, 212, which are typically configured as end nodes (EN), coupled to token ring (TR) networks 204, 214, respectively. Intermediate session routing occurs when intermediate stations 206, 216, configured as APPN network nodes (NN), are present in a session between the two end nodes. The APPN network nodes 206, 216 are further interconnected by a WAN 210 that extends the APPN architecture throughout the network. These intermediate nodes forward frames of an LU-LU session over a calculated route between the two APPN end nodes. APPN network and end nodes are well-known and are, for example, described in detail in *Systems Network Architecture Advanced Peer to Peer Networking Architecture Reference* IBM Doc SC30-3422 and *APPN Networks* by Jesper Nilausen, printed by John Wiley and Sons, 1994, at pgs 11–99.

Broadly stated, each APPN node includes a control point (CP) that manages and coordinates APPN related functions for the node. An APPN network node is a full-functioning APPN router node having all APPN base service capabilities, including directory services functions. An APPN end node, on the other hand, is capable of performing only a subset of the functions provided by an APPN network node. For functions outside is of its capability, the end node relies on registration in an adjacent APPN network node, which acts as its "network node server".

For example, directory services in each APPN end node maintain database information on local resources (i.e., LUs in the end node) in addition to information on LUs in adjacent nodes with which it may want to establish a session and communicate without involving its network node server. Directory services in a network node maintain a database for local resources (LUs in the network node itself) and for resources within an area of control (i.e., "domain") of the network node. A network nodes's domain includes the network node and all APPN end nodes served by the network node. An end node registers its local resources at its network node server via a CP-CP session with the server. In addition, the network node maintains a database for resources outside the network node's domain. Directory information is exchanged among all network nodes in an APPN environment via CP-CP sessions in those nodes.

During session establishment, an LU within a local end node (such as EN 202) requests an optimum route for a session with a partner LU within a remote end node (such as EN 212). The local EN 202 initially searches its directory database for the location of the partner LU. If the location information is not present in the database, the local EN establishes a CP—CP session with its network node server (such as NN 206) to request a search of the NN's local database for the partner LU location. The NN 206 searches its database for local resources and resources within its domain and, if the information is present, the route to the partner LU is calculated and conveyed to EN 202 via a directed locate message exchange through the network 200. Thereafter, a "set-up" or BIND message is forwarded over the route to initiate the session. The BIND includes information pertaining to the partner LU requested for the session.

If the partner LU location is not present in the NN database, the NN 206 accesses a central directory server (CDS) 250 of the APPN network, if one exists. If the CDS does not exist, a broadcast search is performed whereby the NN transmits a broadcast locate command that is flooded among all network nodes in the entire APPN network. After forwarding the broadcast locate command onto the other NNs, each NN issues a broadcast locate within its own domain.

CDS 250 provides centralized registration and search functions of all resources in an APPN network 200. To that end, CDS generally accepts resource registration from and provides directory services to all network nodes in the network. A typical CDS database implementation resides on a mainframe 260 of the APPN network. Searching operations directed to the CDS database generally consume significant resources (e.g., processor cycles) of the mainframe which, in turn, hinder execution of "mission critical" applications running on the mainframe. Accordingly, users generally prefer issuing broadcast locate operations in lieu of CDS searches. However, broadcast searches generally consume network bandwidth, thereby adversely impacting performance of the network. Such broadcast searches should be reduced to improve network bandwidth and the present invention is directed to alleviating this bandwidth problem.

SUMMARY OF THE INVENTION

The invention comprises a technique for offloading a central directory services (CDS) function from a mainframe of an advanced peer-to-peer networking (APPN) network having APPN network nodes to a database residing on another dissimilar network. More specifically, the invention comprises a technique for offloading APPN CDS functions from a mainframe to a light-weight directory access protocol (LDAP) Accessible Directory Services (LADS) of the dissimilar network while each APPN network node continues to maintain its local directory services. According to the inventive technique, at least one network node of the APPN network is configured with an LDAP interface that enables communication with the LADS. The LADS, in turn, is configured to provide CDS functionality on the dissimilar network, such as a Transmission Control Protocol/Internet Protocol (TCP/IP) network. In response to a request from a node on the APPN network, the LDAP interface accesses the LADS using the LDAP protocol in accordance with a client-server architecture.

The invention may be embodied as (i) a proxy CDS interface or (ii) a direct access to LDAP interface. According to the proxy CDS embodiment, a designated network node provides access to the LADS on behalf of the entire APPN network. Directory services are provided to APPN nodes in a transparent manner, i.e., conventional APPN data flows and traffic may be employed to request and receive CDS services. The proxy CDS approach may be implemented on an existing APPN network to offload CDS processing from the mainframe by redirecting CDS requests in the network to the proxy interface.

In the direct access to LDAP embodiment, each network node is configured with an LDAP interface for accessing the LADS on the TCP/IP network. This approach reduces APPN locate flows as well as Central Resource Registration (CRR) flows in an APPN network because these flows are converted to directly-forwarded requests to the LADS over the TCP/IP network. However, each network node must be configured and activated for execution of the LDAP protocol.

Advantageously, the invention improves the efficiency of bandwidth usage and throughput in the APPN network because of the reduction of unnecessary broadcast searches in the network. Offloading of CDS services from the APPN mainframe improves execution efficiency of "mission critical" applications by obviating mainframe performance degradation due to CDS searches. Moreover, the invention leverages existing directory services that support the LDAP protocol.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 3:
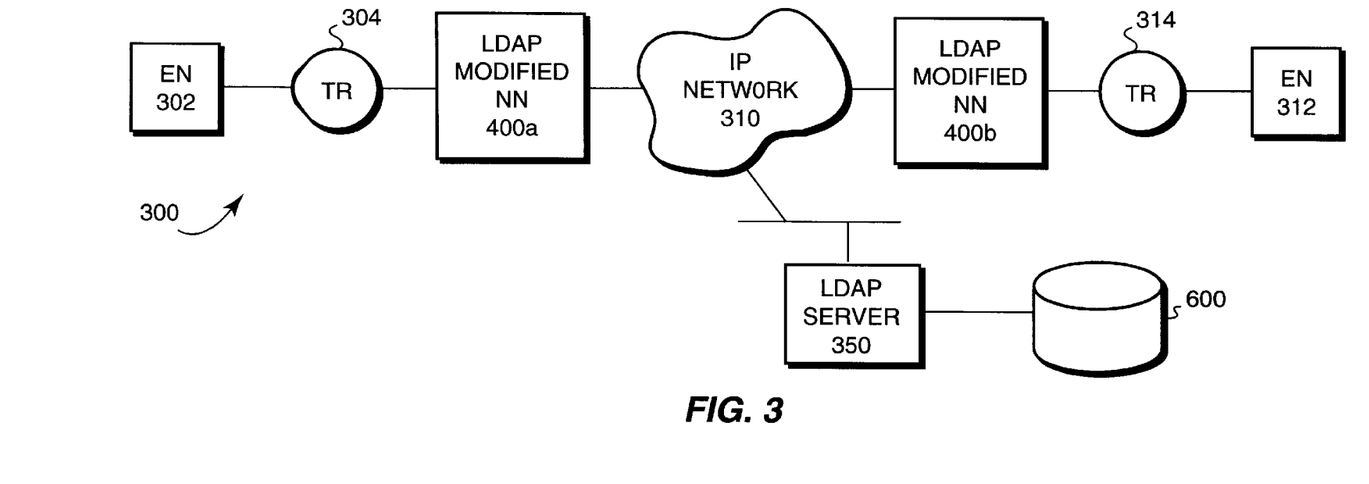
FIG. 3 is a schematic block diagram of a computer network including an APPN network node modified in accordance with a light-weight directory access protocol (LDAP) interface to interconnect various subnetworks and communication links on which the present invention may advantageously operate.

FIG. 3 is a schematic block diagram of a computer network 300 comprising a collection of interconnected communication links and subnetworks attached to a plurality of stations. The stations are typically computers comprising end stations 302, 312 and intermediate stations 400a,b. Preferably, the end stations are Advanced Peer to Peer Networking (APPN) end nodes, although the stations may comprise other types of nodes such as Low Entry Networking nodes or Physical Units 2.0 via Dependent Logical Unit Requestor functions. In addition, the intermediate stations 400a,b (generally designated 400) are preferably APPN network nodes modified in accordance with a light-weight directory access protocol (LDAP) interface according to the present invention.

Each node typically comprises a plurality of interconnected elements, such as a processor, a memory and a network adapter. The memory may comprise storage locations addressable by the processor and adapter for storing software programs and data structures associated with the inventive technique. The processor may comprise processing elements or logic for executing the software programs and manipulating the data structures. An operating system, portions of which are typically resident in memory and executed by the processor, functionally organizes the node by, inter a/ia, invoking network operations in support of software processes executing on the node. It will be apparent to those skilled in the art that other processor and memory means, including various computer readable media, may be used for storing and executing program instructions pertaining to the technique described herein.

The subnetworks included within network 300 are preferably local area networks (LANs) and the communication links may include wide area network (WAN) links; in the illustrative embodiment of the invention, the LANs are token rings (TR) 304, 314 and a Transmission Control Protocol/Internet Protocol (TCP/IP) network 310, which may comprise either a LAN and/or a WAN configuration such as X.25, interconnects the nodes 400. As described further herein, an LDAP server 350 having a database 600 is coupled to the TCP/IP network 310. Communication among the nodes coupled to the network 300 is typically effected by exchanging discrete data packets or frames via connection-oriented service sessions between the communicating nodes.

Figure 4:
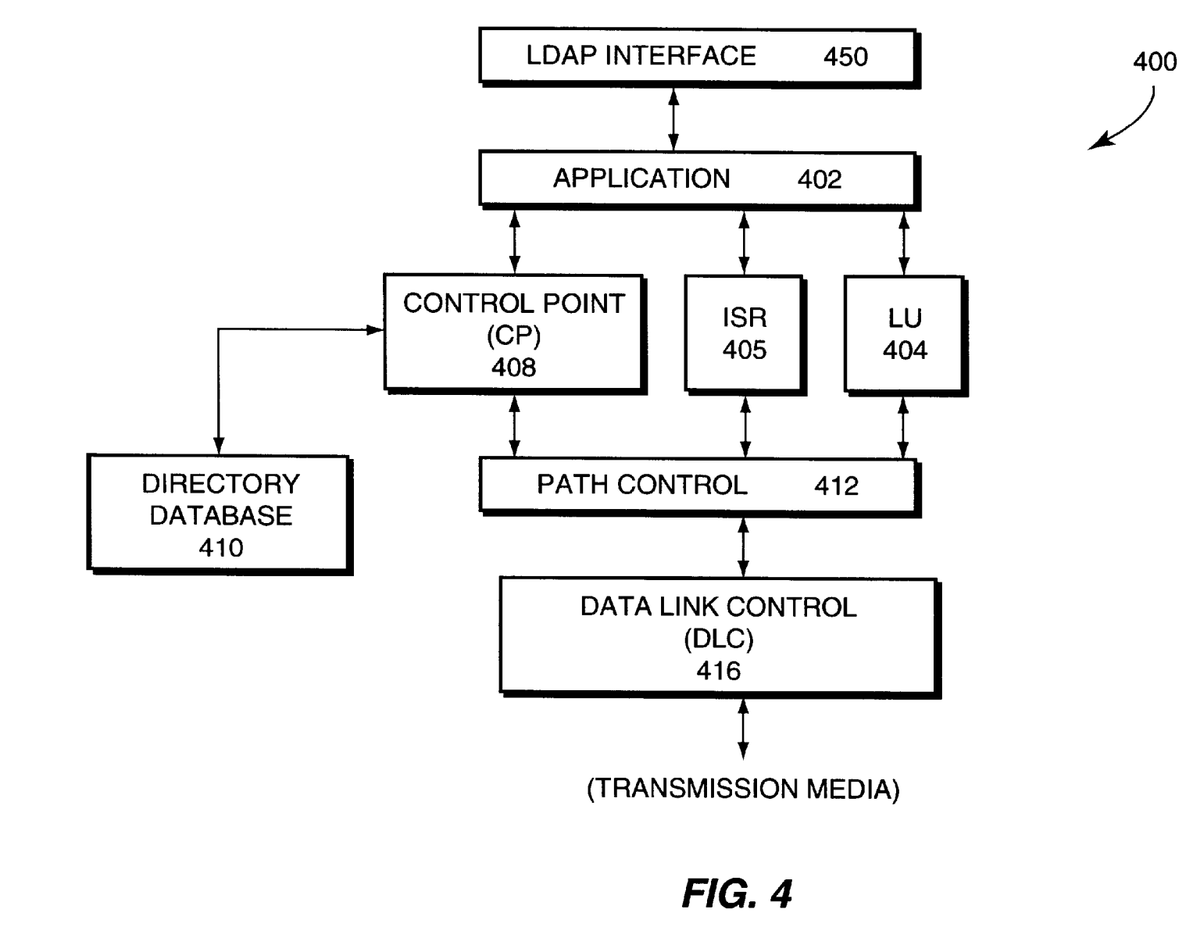
FIG. 4 is a schematic block diagram of the software architecture an LDAPmodified APPN network node according to the invention.

FIG. 4 is a schematic block diagram of the software architecture of an APPN network node 400 modified to operate with an LDAP interfacing technique of the present invention. Application 402 communicates with another node through an LU-LU session; LU 404 within the node functions as both a logical port for the application to the network and as an end point of the communication session. The session generally passes through a path control module 412 and a data link control (DLC) module 416 of the node, the latter of which connects to various network transmission media.

When functioning as an APPN router node, an intermediate session routing (ISR) module 405 maintains a portion of the session in each "direction" with respect to an adjacent network node of network 300. In response to receiving the BIND message during session establishment, path control 412 and ISR 405 are invoked to allocate resources for the session. In particular, each router node allocates a local form session identifier for each direction of the session. Collectively, each of these individually-established "local" sessions form the logical communication session between LUs of, e.g., the end nodes 302, 312.

During session establishment, an end node (such as EN 302) establishes a CP—CP session with a control point (CP) module 408 of the APPN network node 400 to request a search to acquire location information for a partner LU. The CP 408 coordinates performance of all APPN functions within the node, including maintenance of a directory services database 410. The CP searches its database for local resources and resources within its domain and, if the information is present, the route to the partner LU is calculated and conveyed to EN 302 via a directed locate message exchange through the network 200. Thereafter, the BIND message is forwarded over the route to initiate the session.

If the partner LU location is not present in the database 410, the APPN network node 400 either accesses a central directory server (CDS) of the APPN network to request the location information or issues a broadcast search among all network nodes in the network. A typical implementation of CDS resides in a virtual telecommunications access method (VTAM) on a mainframe of the APPN network. VTAM is software system that manages a network, such as an SNA or APPN network. Searching of the CDS database consumes significant resources of the mainframe that may be otherwise used for executing VTAM-related or "mission critical" applications, whereas broadcast searches consume valuable network bandwidth. In either case, there is an adverse impact on the performance of the APPN network resources. The invention provides a technique for offloading the CDS function from the mainframe of the APPN network to a database residing on another dissimilar network.

Figure 6:
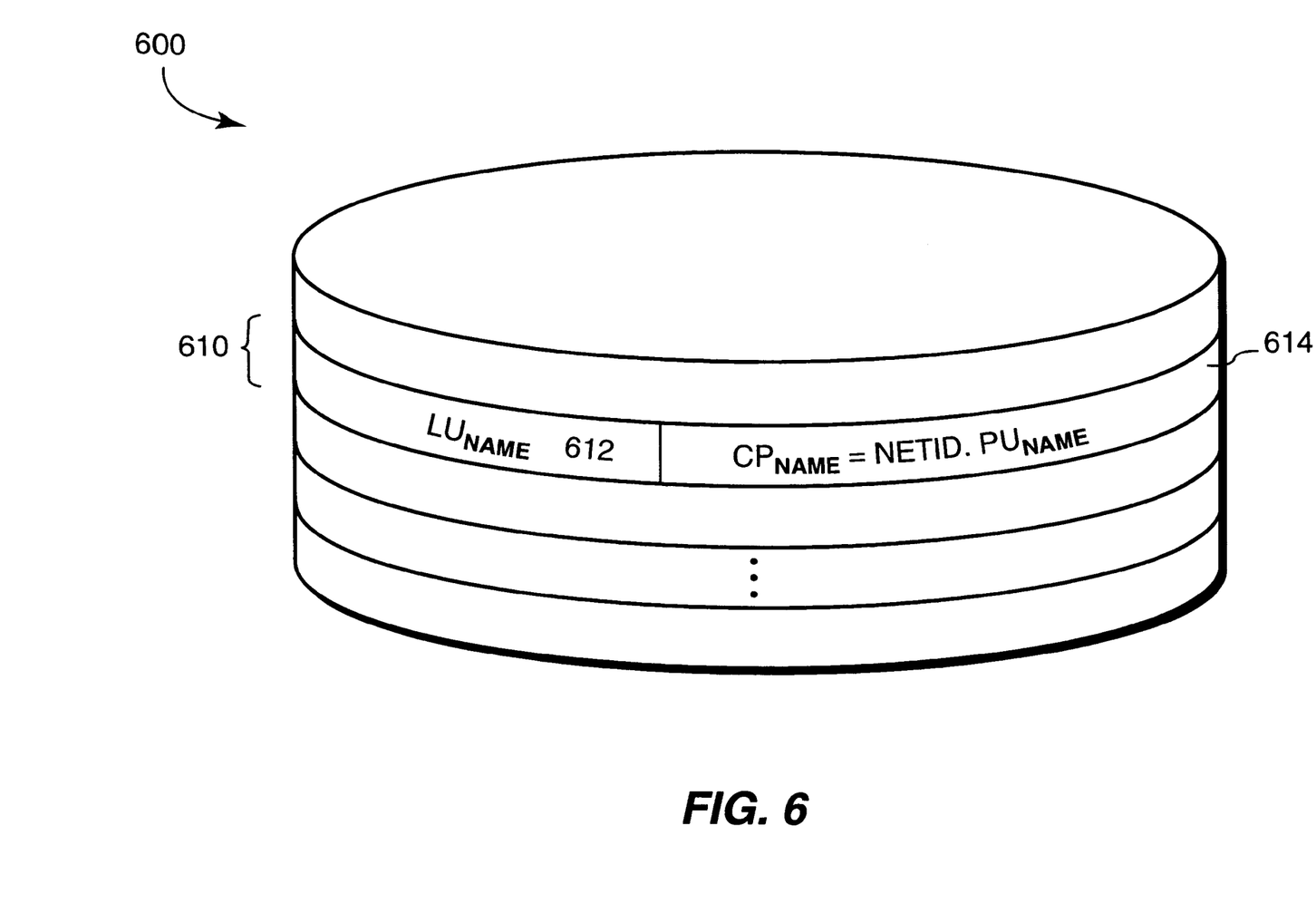
FIG. 6 is a schematic diagram of the structure of a central directory service database coupled to an LDAP server which, collectively, are organized as an LDAP Accessible Directory Services according to the present invention.

According to the inventive technique, APPN network node 400 is configured with an LDAP interface 450 that enables communication with the LDAP server 350. The LDAP interface 450 is preferably implemented as an applications programming interface (API) layer coupled to application layer 402 of the node 400. In response to a request from a node on the APPN network, the LDAP interface 450 accesses the database 600 of the LDAP server 350 using a conventional LDAP protocol over the TCP/IP network in accordance with a client-server architecture.

Figure 5:
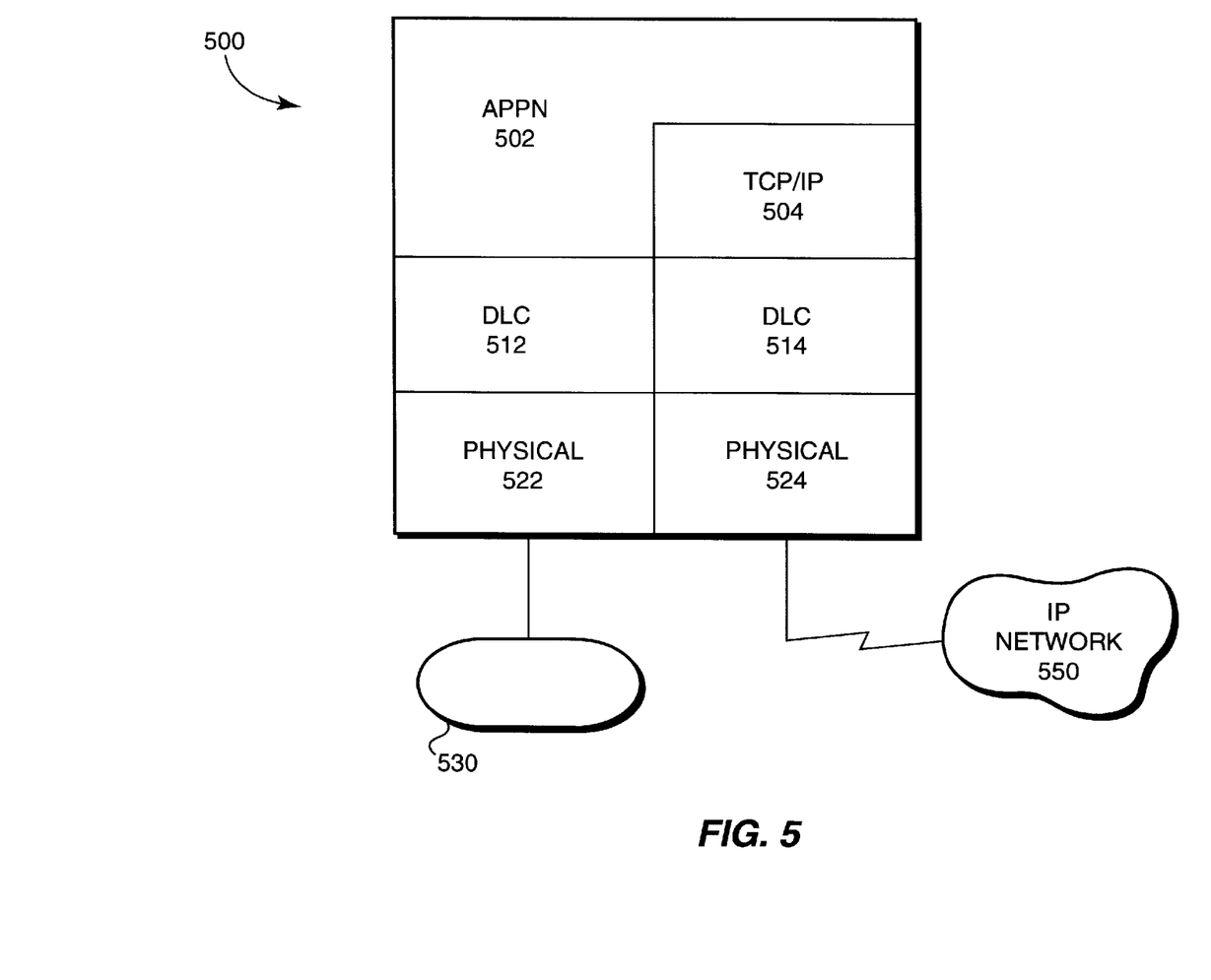
FIG. 5 is a schematic block diagram of protocol stacks contained within LDAPmodified APPN network node of the present invention.

FIG. 5 is a schematic block diagram of a protocol stack 500 within the APPN network node 400. Applications executing on SNA devices (end stations) 302, 312 typically access the network through logical units (LUs) of the stations and communicate via LU—LU sessions. Network node 400 functions to facilitate establishment and routing of these connection-oriented communication sessions within the network. To accomodate such routing establishment operations, protocol stack 500 preferably comprises an APPN layer 502 that contains the software modules described in FIG. 4.

The stack 500 also includes a Transmission Control Protocol/Internet protocol (TCP/IP) layer 504 containing those layers of the Internet communications architecture protocol stack (FIG. 1) needed to establish, e.g., conventional connection-oriented, TCP communication sessions. Data link control (DLC) layers 512 and 514 provide a connection-orented service via conventional DLC connections, while physical sublayers 522 and 524 specify the electrical, mechanical, procedural and functional specifications for activating, maintaining and de-activating the physical links 530 and 550 of the network. The establishment of TCP sessions is described in *Internetworking with TCP/IP* by Comer and Stevens, printed by Prentice Hall, 1991, which publication is hereby incorporated by reference as though fully set forth herein.

FIG. 6 is a schematic diagram of the structure of the database 600 which is generally configured similar to a traditional CDS database of an APPN network. That is, the information stored on the CDS database is similar to the information provided by APPN nodes when registering their resources on a CDS database and, to that end, generally pertains to the resource name and its hierarchical association in the APPN network. Accordingly, the database 600 comprises a plurality of information units, schematically shown at 610, each of which includes a plurality of fields. For example, a field 612 contains the name of an LU resource (LU name) and a field 614 contains the name of an associated control point of its network node server (CP name). The CP name is preferably symbolically represented as CP name=NETID.PU name, wherein NETID is a network identifier and PU name is the name of a physical unit (PU) resource.

In the illustrative embodiment described herein, the LDAP server 350 (in connection with the CDS database 600) is preferably organized as a conventional X.500 directory service, hereinafter referred to as LDAP Accessible Directory Services (LADS). A requirement of the invention is that the server 350 operate according to the LDAP protocol that is typically used in OSI environments over X.500 directory services networks. Broadly stated, the LDAP protocol enables peer nodes to communicate in a client-server arrangement to access a directory service over the TCP/IP network. The LDAP protocol is well-known and described in detail in *Request for Comment (RFC)* 1777 by Yeong, Howes & Kille, 1995 at pgs 1–38, which is hereby incorporated by reference as though fully set forth herein.

In accordance with the invention, the LDAP interfacing technique may be embodied as (i) a proxy CDS interface or (ii) a direct access to LDAP interface. According to the proxy CDS embodiment, all requests for directory services from nodes of the APPN nework are directed to a designated network node (such as network node 400) rather than to the CDS in VTAM. In other words, the designated network node 400 is advertised throughout the APPN network as a CDS such that all CDS requests issued by network nodes of the APPN network "funnel" to the node 400. The proxy CDS node 400 then provides access to the LADS on behalf of the entire APPN network through its LDAP interface.

Directory services are provided to APPN nodes in a transparent manner, i.e., conventional APPN data flows and traffic may be employed to request and receive CDS services. The proxy CDS approach may be implemented on an existing APPN network to offload CDS processing from the mainframe by redirecting CDS requests in the network to the proxy interface. An advantage of this embodiment is that just one network node need be configured with the proxy CDS feature; this reduces the overall impact on an existing APPN network.

In the direct access to LDAP embodiment, each network node of the APPN network is configured with an LDAP interface 450 for directly accessing the database of LDAP server 350 over the TCP/IP network. This approach reduces APPN locate flows as well as Central Resource Registration (CRR) flows over the APPN network because these flows are converted to directly-forwarded requests to the LADS over the TCP/IP network. However, each network node must be configured and activated for execution of the LDAP protocol.

Advantageously, the invention improves the efficiency of bandwidth usage and throughput in the APPN network because of the reduction of unnecessary broadcast searches in the network. Offloading of CDS services from the APPN mainframe improves execution efficiency of "mission critical" applications by obviating mainframe performance degradation due to CDS searches. Moreover, the invention leverages existing directory services that support the LDAP protocol.

While there has been shown and described an illustrative embodiment for offloading a CDS function from a mainframe of an APPN network to a database residing off the mainframe on another dissimilar network, it is to be understood that various other adaptations and modifications may be made within the spirit and scope of the invention. For example in an alternate embodiment of the invention, the LDAP server 350 (in connection with the CDS database) may be configured in accordance with other directory service organizations, such as NetWare Directory Services from Novell, Inc. As noted, a requirement of any embodiment of the server 350 is that it operate according to the LDAP protocol described in detail in *Request for Comment (RFC) 1777* by Yeong, Howes & Kille.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for offloading a central directory services (CDS) function from a mainframe of an advanced peer-to-peer networking (APPN) network to a database residing on a dissimilar network, the method comprising the steps of:
    modifying at least one network node of the APPN network with a light-weight directory access protocol (LDAP) interface;
    organizing the database to provide CDS functionality on the dissimilar network; and
    in response to a request from another node of the APPN network, accessing the CDS database in accordance with an LDAP protocol to enable communication between the LDAP interface and CDS database.

2. The method of claim 1 wherein the dissimilar network is a Transmission Control Protocol/Internet Protocol (TCP/IP) network.

3. The method of claim 2 wherein the step of modifying further comprises the step of configuring the LDAP interface as one of a proxy CDS interface and a direct access LDAP interface.

4. The method of claim 3 wherein the step of configuring the LDAP interface comprises the step of designating the at least one network node as a proxy CDS interface that provides access to the CDS database on behalf of all nodes of the APPN network.

5. The method of claim 3 wherein the step of configuring the LDAP interface comprises the step of configuring each network node of the APPN network with an LDAP interface such that each network node has direct access to the CDS database.

6. The method of claim 1 wherein the CDS database is a LDAP Accessible Directory Services.

7. A system configured to offload a central directory services (CDS) function from a mainframe of an advanced peer-to-peer networking (APPN) network to a database residing off the mainframe on a dissimilar network, the system comprising:
    at least one network node of the APPN network coupled to the dissimilar network and configured with a light-weight directory access protocol (LDAP) interface;
    a database with CDS functionality coupled to the dissimilar network, the CDS database organized as an LDAP Accessible Directory Services (LADS); and
    means, coupled to the at least one network node, for accessing the LADS in accordance with an LDAP protocol to enable communication between the LDAP interface and LADS.

8. The system of claim 7 wherein the dissimilar network is a Transmission Control Protocol/Internet Protocol (TCP/IP) network.

9. The system of claim 8 wherein the LDAP interface is configured as one of a proxy CDS interface and a direct access LDAP interface.

10. The system of claim 9 wherein the proxy CDS interface comprises a designated network node that provides access to the LADS on behalf of all nodes of the APPN network.

11. The system of claim 9 wherein the direct access LDAP interface comprises each network node of the APPN network configured with an LDAP interface to enable each network node to directly access to the LADS.

12. A method of offloading a central directory services (CDS) function within a mainframe of an advanced peer-to-peer networking (APPN) network to a dissimilar network, the method comprising the steps of:
    offloading the CDS to the dissimilar network;
    modifying at least one node to access the CDS at the dissimilar network;
    tunneling a CDS request from another node to the modified node; and
    accessing of the CDS by the modified node on behalf of the requesting node.

13. The method of claim 12, wherein the CDS offloading step comprises of:
    offloading the CDS functions from a mainframe to a light-weight directory access protocol (LDAP) accessible directory services (LADS) of the dissimilar network.

14. The method of claim 13, wherein the node modifying step comprises of:
    configuring the node with a light-weight directory access protocol (LDAP) interface that enables communication with the LADS.

15. The method of claim 12, wherein the dissimilar network is a Transmission Control Protocol/Internet Protocol (TCP/IP) network.

16. The method of claim 14 wherein the node modifying step further comprises the step of:
    configuring the LDAP interface as one of a proxy CDS interface and a direct access LDAP interface.

17. A system configured to offload a central directory services (CDS) function from a mainframe of an advanced peer-to-peer networking (APPN) network to a dissimilar network, the system comprising:
    the CDS functions coupled to the dissimilar network;
    at least one network node of the APPN network coupled to the dissimilar network and having access to the CDS;
    a CDS request node coupled to the CDS access node to funnel a request, wherein the CDS access node accesses the CDS on behalf of the CDS request node.

18. The system of claim 17, wherein the CDS functions are included in a light-weight directory access protocol (LDAP) accessible directory services (LADS) of the dissimilar network.

19. The method of claim 18, wherein the CDS access node is configured with a light-weight directory access protocol (LDAP) interface that enables communication with the LADS.

20. The system of claim 17 wherein the dissimilar network is a Transmission Control Protocol/Internet Protocol (TCP/IP) network.

21. The system of claim 19 wherein the LDAP interface is configured as one of a proxy CDS interface and a direct access LDAP interface.

* * * * *